(12) United States Patent
Stein

(10) Patent No.: US 9,736,550 B2
(45) Date of Patent: *Aug. 15, 2017

(54) PROCESSING EMERGENCY ALERT SYSTEM MESSAGES

(71) Applicant: Google Technology Holdings LLC, Mountain View, CA (US)

(72) Inventor: Robert C. Stein, Coopersburg, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,307

(22) Filed: Aug. 11, 2015

(65) Prior Publication Data
US 2016/0105729 A1 Apr. 14, 2016

Related U.S. Application Data

(63) Continuation of application No. 13/593,740, filed on Aug. 24, 2012, now Pat. No. 9,137,563.

(51) Int. Cl.
*H04N 7/10* (2006.01)
*H04N 21/81* (2011.01)
(Continued)

(52) U.S. Cl.
CPC ......... *H04N 21/814* (2013.01); *H04N 21/436* (2013.01); *H04N 21/6405* (2013.01)

(58) Field of Classification Search
CPC ......... H04N 21/4421; H04N 21/23418; H04N 21/2407; H04N 21/4394; H04N 21/44204; H04N 21/44222
(Continued)

(56) References Cited

U.S. PATENT DOCUMENTS 5,659,596 A * 8/1997 Dunn ..................... H04W 4/12
455/456.1
5,867,494 A * 2/1999 Krishnaswamy ... H04L 65/4038
370/352
(Continued)

OTHER PUBLICATIONS

'www.scte.org' [online] "ANSI/SCTE 18 2007," [retrieved from internet on Jan, 9, 2017] Retrieved from Internet: URL<http://www.scte.org/documents/pdf/standards/ansi_scte%2018%202007.pdf> 31 pages.
(Continued)

*Primary Examiner* — Annan Shang
(74) *Attorney, Agent, or Firm* — Fish & Richardson P.C.

(57) ABSTRACT

Disclosed are methods and apparatus for processing an emergency alert message (e.g., a national warning system message e.g., an Emergency Alert System (EAS) message). The methods may comprise a digital media server receiving the message. The digital media server may notify client devices (that are connected to that server via a residential Local Area Network) that it has received such a message. The client devices notified may be those that have requested (e.g., to the digital media server) that they are notified if the digital media server receives such a message. The digital media server may convert the message from being in a first format to being in a second format. The digital media server may acquire, and provide for use by the client device, information that may be used a client device to ascertain whether the message is a new, an updated, or a duplicate message.

27 Claims, 9 Drawing Sheets

(51) Int. Cl.
*H04N 21/436* (2011.01)
*H04N 21/6405* (2011.01)

(58) Field of Classification Search
USPC ............... 725/33, 34, 87–118; 709/217–232
See application file for complete search history.

(56) References Cited

U.S. PATENT DOCUMENTS

| | | | |
|---|---|---|---|
| 5,999,525 A | 12/1999 | Krishnaswamy | |
| 6,335,927 B1* | 1/2002 | Elliott | H04L 12/14 370/352 |
| 6,731,625 B1 | 5/2004 | Eastep | |
| 6,891,841 B2* | 5/2005 | Leatherbury | H04L 12/2801 370/401 |
| 7,085,814 B1* | 8/2006 | Gandhi | H04L 29/1232 709/208 |
| 7,145,898 B1 | 12/2006 | Elliott | |
| 7,194,249 B2 | 3/2007 | Phillips | |
| 7,363,360 B2* | 4/2008 | Miller, II | H04L 12/2602 709/223 |
| 7,617,329 B2* | 11/2009 | Quach | G06F 12/0831 709/230 |
| 7,702,653 B1* | 4/2010 | Tan | G06F 17/30867 707/999.107 |
| 7,729,709 B1* | 6/2010 | Loeb | H04L 67/18 455/2.01 |
| 8,050,281 B2 | 11/2011 | Casey | |
| 8,346,626 B2* | 1/2013 | Robertson | G06Q 30/02 705/26.8 |
| 8,509,729 B2* | 8/2013 | Shaw | G08B 27/006 370/356 |
| 8,539,552 B1* | 9/2013 | Grabelsky | H04L 63/0892 709/225 |
| 8,559,446 B2* | 10/2013 | Son | H04L 12/5895 370/236 |
| 8,634,796 B2* | 1/2014 | Johnson | H04W 4/02 455/404.1 |
| 9,137,563 B2* | 9/2015 | Stein | H04N 21/6405 |
| 2002/0039904 A1* | 4/2002 | Anderson | G01S 5/02 455/456.1 |
| 2003/0115317 A1* | 6/2003 | Hickson | H04L 29/06 709/224 |
| 2003/0236892 A1* | 12/2003 | Coulombe | H04L 67/2823 709/228 |
| 2004/0152493 A1 | 8/2004 | Phillips | |
| 2006/0072048 A1* | 4/2006 | Lee | G02F 1/13624 349/38 |
| 2007/0123223 A1 | 5/2007 | Letourneau | |
| 2007/0124779 A1 | 5/2007 | Casey | |
| 2008/0189162 A1 | 8/2008 | Ganong | |
| 2009/0031006 A1* | 1/2009 | Johnson | H04W 76/021 709/218 |
| 2009/0106645 A1 | 4/2009 | Knobel | |
| 2009/0204672 A1* | 8/2009 | Jetha | G06Q 30/02 709/204 |
| 2010/0299407 A1* | 11/2010 | Casey | G06F 19/3418 709/219 |
| 2011/0055338 A1* | 3/2011 | Loeb | B60R 22/34 709/206 |
| 2012/0126976 A1* | 5/2012 | Bugenhagen | G08B 25/08 340/540 |
| 2012/0174144 A1* | 7/2012 | Flores Xavier | H04H 60/31 725/14 |
| 2013/0217332 A1* | 8/2013 | Altman | H04H 60/90 455/41.2 |
| 2014/0019561 A1* | 1/2014 | Belity | H04L 51/22 709/206 |

OTHER PUBLICATIONS

'www.upnp.org' [online] "Content Directory: 2 Service Template Version 1.01 for UPnP version 1.0" May 31, 2006, [retrieved from internet on Jan. 9, 2017] Retrieved from Internet: URL< http://www.upnp.org/specs/av/upnp-av-contentdirectory-v2-Service.pdf> 172 pages.

"www.upnp.org" [online] "Content Directory: 3 Service Template Version 1.01 for UPnP version 1.0," Sep. 20, 2007, [retrieved from Internet: URL< http://upnp.org/specs/av/upnp-as-contentdirectory-v3-service.pdfx 248 pages.

'tools.oettorg' [online] "DNS Long-lived Queries" [retrieved from internet on Jan. 9, 2017] Retrieved from Internet: URL<https://tools.ictf.org/html/draft-sekar-dns-11q-01> 21 pages.

'www.scte.org' [online] "ANSI/SCTE 162 2009," [retrieved from internet on Jan. 9, 2017] Retrieved from Internet: URL<http://upnp.org/specs/av/UPnP-av-ContentDirectory-v3-Service.pdf>.

* cited by examiner

PROCESSING EMERGENCY ALERT SYSTEM MESSAGES

CROSS-REFERENCE TO RELATED APPLICATIONS

This application is a continuation application of, and claims priority to, U.S. patent application Ser. No. 13/593,740, titled "Processing Emergency Alert System Messages," filed on Aug. 24, 2012. The disclosure of the foregoing application is incorporated herein by reference in its entirety for all purposes.

FIELD

The present invention relates to processing emergency alert messages, for example Emergency Alert System (EAS) messages.

BACKGROUND

Digital media servers (e.g., set-top boxes) in a home network (e.g., a residential local area network) may support a national emergency alert system by presenting emergency alert information to client devices in that home network. The servers in the home network may receive the emergency alert information from a multimedia service head-end.

Client devices (such as desktop computers, laptop computers, tablet computers, smartphones, set-top boxes, games consoles, etc.) may receive emergency alert information via the home network. For example, Digital Living Network Alliance (DLNA) compliant Universal Plug and Play (UPnP) may be used by some media servers and client devices to distribute emergency alert system messages on the home network, thereby allowing presentation of these messages to end users.

However, some servers and/or devices are incapable of using, or are not configured to use, DLNA compliant UPnP.

DETAILED DESCRIPTION

Figure 1:
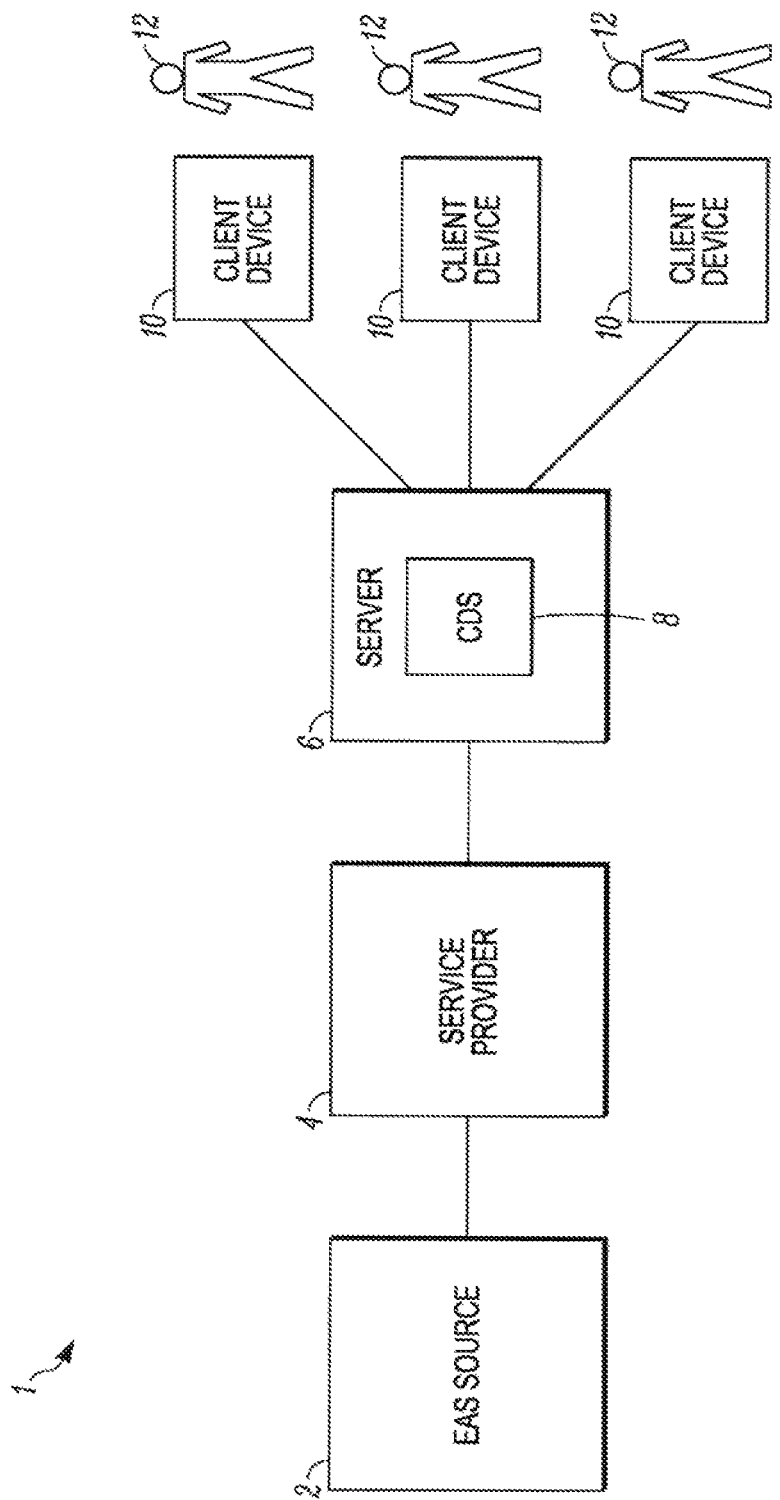
FIG. 1 a schematic illustration (not to scale) of an example of a network for processing emergency alert messages.

Embodiments disclosed herein provide methods and apparatuses for processing an emergency alert message (e.g., a national warning system message such as an Emergency Alert System (EAS) message). The methods may include a digital media server receiving (e.g., from a service provider) an emergency alert message. The digital media server may notify client devices (that are connected to that server via a residential Local Area Network) that it has received an emergency alert message. The client devices notified may be those that have requested (e.g., to the digital media server) that they are notified if the digital media server receives an emergency alert message.

In some embodiments for processing an emergency alert message, the methods may comprise a digital media server receiving (e.g., from a service provider) an emergency alert message. The digital media server may convert the emergency alert message from being in a first format (e.g., a format that is not suitable for distribution to client devices on a residential Local Area Network) to being in a second format (e.g., a format that is suitable for distribution to client devices on a residential Local Area Network). For example, an emergency alert message in a first format that is compliant with the SCTE-18 standard may not suitable for distribution to client devices. The digital media server may convert the emergency alert messages to a second format, such as a format that is compliant with the SCTE-162 standard.

In some embodiments for processing an emergency alert message, the methods may include a digital media server receiving (e.g., from a service provider) an emergency alert message. The digital media server may acquire (e.g., by processing or extracting from the received emergency alert message) information that may be used a client device to ascertain whether the emergency alert message is a new message, an updated message, or a duplicate message. The acquired information may then be provided for use by the client device.

In some embodiments, the digital media server may subscribe a client device to a service provided by that digital media server. The service may be such that, if the digital media server receives an emergency alert message, the client device is notified that the digital media server has received an emergency alert message. The method may include the digital media server sending, to the client device, a service message that indicates that the digital media server provides the service. The digital media server may then receive (from the client device) a request that the client device be subscribed to the service. The digital media server may then subscribe the client device to the service.

In some embodiments, the digital media server may convert the emergency alert message to be in a format that is suitable for distribution on the residential Local Area Network. For example, the emergency alert message may be converted into an Extensible Markup Language (XML) format. For example, as described in more detail later below, the emergency alert message may be converted from being compliant with the SCTE-18 standard to being compliant with the SCTE-162 standard.

In some embodiments, the digital media server may provide, e.g., for use by the client device, the emergency alert message or a Universal Resource Locator that may be used the client device to retrieve the emergency alert message.

In some embodiments, the digital media server may provide, e.g., for use by the client device, information that may be used to ascertain whether the emergency alert message is a new message, an updated message, or a duplicate message.

In the following description, like reference numerals refer to like elements.

The following description is based on embodiments of the invention and should not be taken as limiting with regard to alternative embodiments that are not explicitly described herein.

An apparatus for implementing any of the below described arrangements, and performing any of the below described methods, may be provided by configuring or adapting any suitable apparatus, for example one or more computers or other processing apparatus or processors, and/or providing additional modules. The apparatus may include a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the processes depicted in the below described process flowcharts may be omitted or such processes may be performed in an order different than that presented below and shown in the process flowcharts. Furthermore, although all the processes have, for convenience and ease of understanding, been depicted as discrete and temporally-sequential, nevertheless some of the processes may in fact be performed simultaneously or at least overlapping to some extent temporally.

Referring now to the Figures, FIG. 1 is a schematic illustration (not to scale) of an example of a network 1 in which embodiments of a method of may be implemented.

In the example network 1, a source of Emergency Alert System (EAS) messages (hereinafter referred to as an EAS source and indicated in FIG. 1 by the reference numeral 2) may be connected to a service provider 4. An Emergency Alert System message may also be referred to as an Emergency Alert Service message, or an Emergency Alert Signalling message. Examples of the EAS sources include the National Weather Service of the United States of America, the Federal Emergency Management Agency (FEMA), the Transportation Security Agency (TSA), the National Oceanic and Atmospheric Agency (NOAA), etc. The EAS source 2 may be connected to the service provider 4 by any appropriate transmission medium e.g., wired or wireless communication link, or via the Internet. This connection between the EAS source 2 and the service provider 4 may be such that EAS messages may be sent from the EAS source 2 to the service provider 4.

The service provider 4 may be a provider of multimedia content and services related to that multimedia content. Examples of the service provider 4 include digital radio providers, analog radio providers, digital television providers, analog television providers, cable television providers, satellite television providers, Internet Protocol television providers, etc. The service provider 4 may be connected to a server 6 by any appropriate transmission medium e.g., a wired or wireless communication link, the Internet, a cable or satellite television network. This connection between the service provider 4 and the server 6 may be such that data (e.g., multimedia content, an EAS message, etc.) may be sent from the service provider 4 to the server 6. For example, the service provider 4 may be configured to use MPEG transport streams to deliver video, audio, and/or data entertainment services to the server 6 (e.g., via a broadband network).

As described in more detail below, the server 6 may be configured to process some or all of the information received by it from the service providers 4. For example, the server 6 may be configured to receive and decode in-band data received from the service providers. Example servers 6 include personal computer platforms or home communication terminals (such as set-top boxes, routers, etc.) which may include storage (such as an integrated hard disk). The server 6 may be connected to each of a plurality of client devices 10 by any appropriate transmission medium, e.g., a wired or wireless communication link, e.g., Wi-Fi. The connection between the server 6 and a client device 10 may be such that data (e.g., multimedia content, an EAS message, etc.) may be sent from the server 6 to the client device 10. Furthermore, the connection between the server 6 and a client device 10 may be such that data may be sent from that client device 10 to the server 6, as described in more detail below.

In other words, the server 6 may be a Digital Media Server (DMS) which may be configured to store content and make it available to client devices 10, which may be networked digital media players/renderers.

In certain embodiments, the server 6 is a Universal Plug and Play (UPnP) media server (MS). Further information on UPnP may be found, for example, in the UPnP Device Architecture 1.1, Oct. 15, 2008, and on www.upnp.org, which are incorporated herein by reference. However, in other embodiments the server 6 is not a UPnP server.

In an example, as depicted in FIG. 1, the server 6 includes a Content Directory Service (CDS) 8. The CDS 8 may include a dynamic, hierarchical structure of digital storage containers, each of which may be capable of storing digital data objects. A digital data object may include an object description, an object content, and/or an object content locator (such as a Uniform Resource Locator (URL)).

This CDS 8 may provide a mechanism for devices (e.g., client devices 10) to obtain detailed information about the features supported by the CDS 8, e.g., a "feature list", that can inform client devices that the CDS 8 supports an EAS message feature.

This CDS 8 may provide a uniform mechanism for devices (e.g., client devices 10) to browse the content on the server 6 and to obtain detailed information about individual content objects. The CDS 8 may additionally provide a lookup/storage service that allows devices to locate (and possibly store) individual objects that the server 6 is capable of providing.

In some embodiments, the CDS 8 is a Universal Plug and Play (UPnP) Content Directory Service. Further information on UPnP Content Directory Services may be found, for example, in Content Directory:2 Service Template Version 1.01 For UPnP Version 1.0, May 31, 2006, and Content Directory: 3 Service Template Version 1.01 For UPnP Version 1.0, Sep. 20, 2007, Version 0.17, and on www.upnp.org, which are incorporated herein by reference. However, in other embodiments the CDS 8 is not a UPnP CDS.

Each client device 10 may be configured to process information received from the server 6. For example, each client device 10 may be configured to render information received by it from the server 6 so that that information may be consumed by a user 12 of that client device 10. For example, a client device may be configured to process and display (e.g., on an integrated display) information (e.g., multimedia content, EAS messages, etc.) so that it may be consumed by the user 12. Example client devices include televisions, audio amplifiers, computers (such as desktop computers, laptop computers, tablet computers, smartphones, etc.), games consoles, wireless monitors, and other consumer electronics devices.

In an example, a client device 10 may be a Digital Media Player (DMP) and/or Digital Media Renderer (DMR). A client device 10 may be configured to find content on the server 6 and provide playback and/or rendering capabilities. A client device 10 may be configured to play content received from a digital media controller (DMC) which may have received content from the server 6.

In some embodiments, one or more of the client devices 10 may be a Universal Plug and Play (UPnP) device. Also, in some embodiments, one or more of the client devices 10 may be a device capable of implementing the Multicast Domain Name Service protocol (mDNS) instead of or in addition to being a UPnP device. For example, in other embodiments a client device 10 may use the iOS mobile operating system (e.g., a client device 10 may be an Apple™ iPod™, iPhone™, or iPad™ device).

The server 6 and the client devices 10 may be part of a residential local area network (LAN), i.e., a home network. For example, the server 6 and the client devices 10 may be parts of the user's home network. For example, server 6 and the client devices 10 may be located in the home of the user 12.

Figure 2:
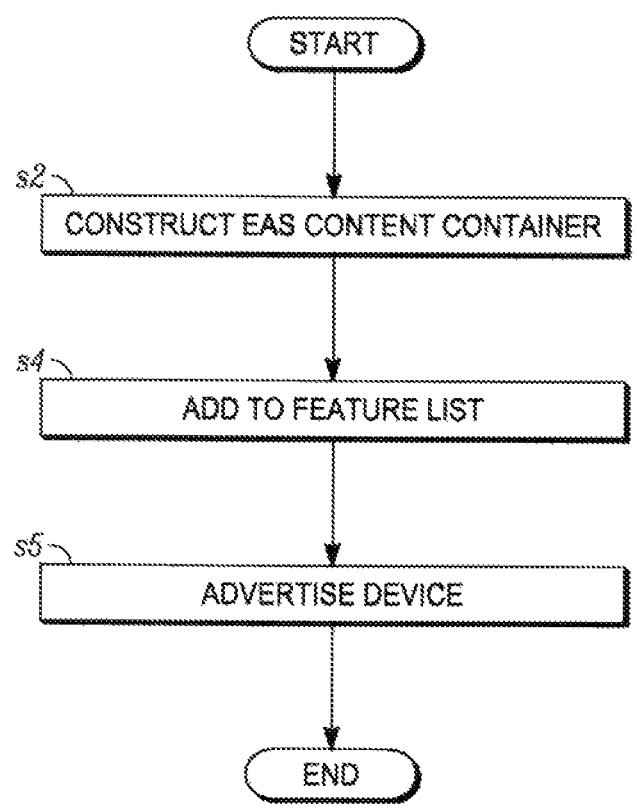
FIG. 2 is a process flow chart showing a method of preparing a Content Directory Service.

FIG. 2 is a process flow chart showing an embodiment of a method of preparing the CDS 8 contained in the server 6 to provide a client device 10 with a notification that a new EAS message has been received by the server 6. In this embodiment, the server 6 is a UPnP server. The process of FIG. 2 may, for example, be performed by the CDS 8 upon booting of the server 6 and after initialisation of a UPnP stack of the server 6. The process of FIG. 2 may, for example, be performed by the CDS 8 whilst building the feature list of the CDS 8.

At s2, the CDS 8 may construct a digital storage container for containing digital data objects relating to EAS messages. This constructed container will hereinafter referred to as the "EAS content container".

At s4, the CDS 8 may add, to its feature list (i.e., to a list of optional features and services that the CDS 8 provides in addition to or related to the individual content objects that may be provided by and/or stored on the server 6), an advertisement or feature that specifies that digital data objects relating to EAS messages may be provided by and/or stored on the server 6. Such a feature is hereinafter referred to as the "EAS feature advertisement". The EAS feature advertisement may include an identifier for the EAS content container. The EAS feature advertisement may include a URL that may be used (as described in more detail later below with reference to FIGS. 3 and 4) by a client device 10 to subscribe to a service that notifies that client device 10 of new EAS messages that are received by the server 6. This URL is hereinafter referred to as the "EAS subscription URL". In other embodiments, the EAS feature advertisement may include the EAS content container ID and not the EAS subscription URL. In this case, a standard service event subscription URL may be used by client devices to request EAS service updates.

At s5, optionally the CDS 8 may advertise itself to the client devices 10 connected to the home network, e.g., by multicasting a message on the home network. This may enable client devices 10 to "discover" the server 6. However, the client devices 10 may discover the server 6 in a different way, e.g., by sending discovery messages as described in more details later below with reference to FIG. 3.

Thus, a method by which the CDS 8 may prepare to provide EAS feature support is provided.

Figure 3:
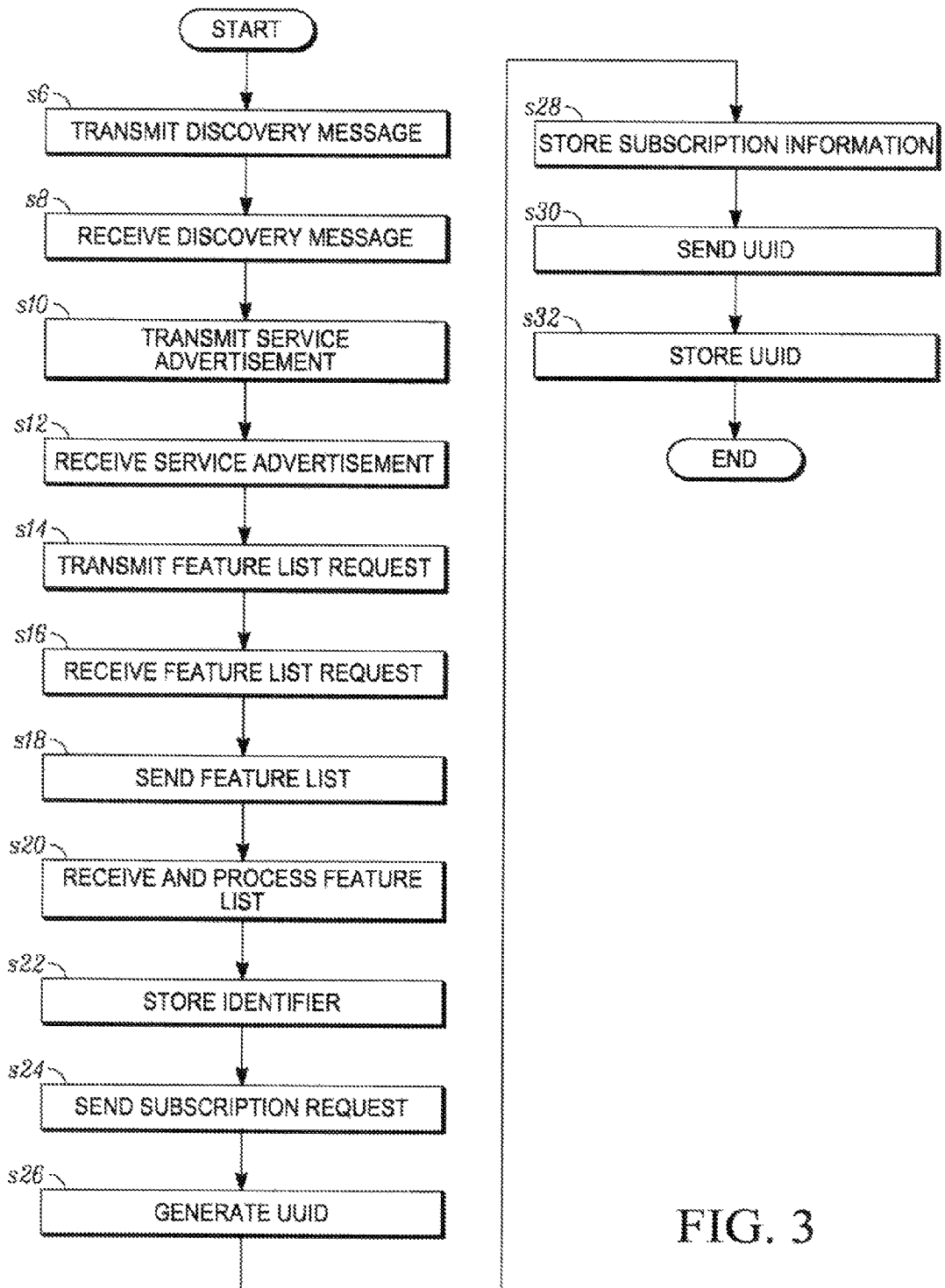
FIG. 3 is a process flow chart showing a method by which a client device may subscribe to a service.

FIG. 3 is a process flow chart showing an embodiment of a method by which a client device 10 may subscribe to a service that notifies that client device 10 that new EAS messages have been or are being received by the server 6. The process of FIG. 3 is described below as being performed by a single client device 10 (referred to in the description of the process as "the client device 10"). However, in operation, the process of FIG. 3 may be performed by one or more (e.g., all) of the client devices 10. In this embodiment, the client device 10 may be a DLNA compliant UPnP device.

The process of FIG. 3 may be performed, for example, after having performed the process of FIG. 2.

At s6, the client device 10 may transmit a discovery message to the server 6 to determine whether a CDS 8 is supported by the server 6. This may be performed by, the client device 10 multicasting a UPnP discovery message, i.e., the client device 10 delivering a discovery message to the group of destination computers to which it is connected. Multicasting the UPnP discovery message tends to be an efficient way to distribute this message. The multicast UPnP discovery message may be delivered simultaneously in a single transmission from the client device 10 to each of the entities with which the client device 10 is connected. The multicast UPnP discovery message is for discovery of the CDS 8.

At s8, the server 6 may receive the discovery message.

At s10, in response to receiving the discovery message, the server 6 may send, to the client device 10, a service advertisement, i.e., a message specifying that the CDS 8 is available to provide information to the client device 10. This service advertisement may be sent from the server 6 to the client device 10 as a unicast message.

At s12, the client device 10 may receive the service advertisement. Using the received service advertisement the client device 10 determines that the CDS 8 is available to provide information to the client device 10. In other words, the client device 10 "discovers" the CDS 8.

At s14, in response to receiving the service advertisement, the client device 10 may send, to the CDS 8, a request for the feature list of the CDS 8. This request may be sent from the client device 10 to the CDS 8 as a unicast message.

At s16, the CDS 8 may receive the request for its feature list.

At s18, in response to receiving the request for its feature list, the CDS 8 may send (e.g., as a unicast message) its feature list to the client device 10. As described in more detail above with reference to s4, in this embodiment the feature list of the CDS 8 may include an EAS feature advertisement. The EAS feature advertisement may include an identifier for the EAS content container.

At s20, the client device 10 may receive and process the feature list. This processing may include the client device 10 extracting, from the received feature list of the CDS 8, an identifier for the EAS message container that is included in the EAS feature advertisement of the feature list.

At s22, the client device 10 may store (e.g., using a storage device integrated win the client device 10), the extracted identifier for the EAS message container.

At s24, the client device 10 may send (e.g., as a unicast message) or post, to the EAS subscription URL extracted at s20, a request to subscribe to the service that notifies the client device 10 of new EAS messages that are received by the server 6. This request is hereinafter referred to as the "EAS subscription request".

At s26, in response to the client device 10 posting the EAS subscription request, the CDS 8 may generate a universally unique identifier (UUID) for the client device 10.

At s28, the CDS 8 may save/store (e.g., using a storage device integrated win the server 6) the subscription information for the client device 10. This subscription information may include the subscription UUID for the client device 10 (determined at s26) and information specifying what service(s) the client device has subscribed to (i.e., the service that notifies the client device 10 of new EAS messages that are received by the server 6).

At s30, the CDS may send the subscription UUID (e.g., as a unicast message) for the client device 10 (determined at s26) to the client device 10.

At s32, the client device 10 may store (e.g., using a storage device integrated win the client device 10), the received subscription UUID. Thus, the client device 10 is subscribed to a service that notifies that client device 10 that new EAS messages have been or are being received by the server 6.

Figure 4:
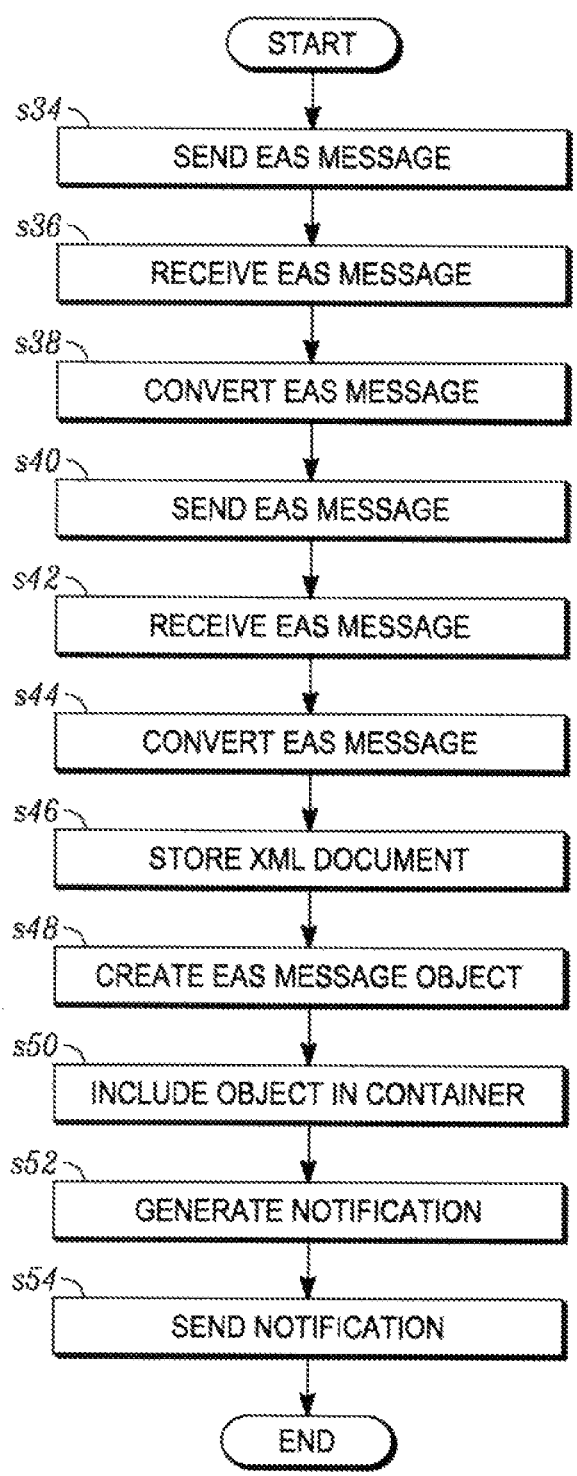
FIG. 4 is a process flow chart showing an example embodiment of a process by which an Emergency Alert Service message may be received by a server, and by which client devices may be notified.

FIG. 4 is a process flow chart showing an embodiment of a process by which a new EAS message may be received by the server 6, and by which client devices 10 (which has subscribed to a service that notifies them that new EAS messages have been or are being received by the server 6) may be notified that a new EAS message has been received by the server 6. In this embodiment, the client device 10 may be a UPnP device.

The process of FIG. 4 may be performed, for example, after having performed the process of FIG. 3.

At s34, the EAS source 2 may send an EAS message to the service provider 4. The EAS message may be sent from the EAS source 2 to the service provider 4 in any appropriate format and via any appropriate transmission medium.

At s36, the service provider 4 may receive the EAS message from the EAS source 2.

At s38, the service provider 4 may process the received EAS message. This may be performed to convert the received EAS message into a different format, such as a SCTE-18 format, or generate an SCTE-18 message corresponding to the received EAS message. The SCTE-18 format (also known as ANSI J-STD-042) is a standard specified by the Society of Cable Telecommunications Engineers (SCTE). Further information on the SCTE-18 Standard may be found, for example, in Society of Cable Telecommunications Engineers, Engineering Committee, Digital Video Subcommittee, American National Standard, ANSI/SCTE 18 2007, Emergency Alert Messaging for Cable, which is incorporated herein by reference.

The processing performed at s38 may, for example, be performed using a SCTE-18 Generator.

Thus an EAS message in SCTE-18 format may be produced.

At s40, the EAS message (that may be in a SCTE-18 format) may be delivered from the service provider 4 to the server 6. The EAS message may be delivered from the service provider 4 to the server 6 using any appropriate transmission medium and any appropriate transmission method. In an example delivery method, an SCTE-18 Generator of the service provider 4 may transmit the EAS message (in SCTE-18 format), e.g., using IP multicast packets, to a Cable Modem Termination System (CMTS) of the service provider 4. The EAS message (in SCTE-18 format) may then be delivered in a DSG™ Internet Protocol (IP) stream from the CMTS to the server 6. In another example delivery method, the EAS message (in SCTE-18 format) may be delivered to the server 6 in a Data Over Cable Service Interface Specification (DOCSIS) IP stream. In another example delivery method, an SCTE-18 Generator of the service provider 4 may transmit the EAS message (in SCTE-18 format), e.g., using IP multicast packets, to an out-of-band modulator (OM) of the service provider 4. The EAS message (in SCTE-18 format) may then be delivered in a Quadrature Phase Shift Keying (QPSK) out-of-band (OOB) stream from the OM to the server 6.

At s42, the server 6 may receive the EAS message in the corresponding format (e.g., in SCTE-18 format).

At s44, the server 6 may process the received EAS message. This may be performed to convert the received EAS message from the first format, e.g., SCTE-18 format into a second format, e.g., SCTE-162 format. Similarly, the received EAS messages may be converted from SCTE-18 format into the CEA-2035 or the ATIS 0800012 format. The SCTE-162 format (also known as ANSI J-STD-070/DVS-847 [SCTE-EAS], and also available as ATIS-0800012) is a standard specified by the Society of Cable Telecommunications Engineers (SCTE). Further information on the SCTE-162 Standard may be found, for example, in Society of Cable Telecommunications Engineers, Engineering Committee, Digital Video Subcommittee, American National Standard, ANSI/SCTE 162 2009, Emergency Alert Signaling for the Home Network, which is incorporated herein by reference. The translation of the EAS message from SCTE-18 format to SCTE-162 format may provide that the EAS message is translated (by the server 6 hosting the CDS 8) to a format suitable for distribution on the home network to the client devices 10. In other embodiments, a different format other than SCTE-162 may be used.

This processing may be performed using any appropriate translation method for translating the message in the first format to a message in the second format, e.g., translating a SCTE-18 EAS message to a SCTE-162 EAS message.

The translation of the EAS message from the SCTE-18 format to the SCTE-162 format may result in an Extensible Markup Language (XML) document representing the EAS event being generated.

In some embodiments, EAS messages may be delivered from the service provider 4 to the server 6 via IP multicast from the service provider 4. In such embodiments, the EAS message may be repackaged from IP multicast for distribution to the client devices 10 on the home network. The delivery of the message using IP multicast, and in a format that is suitable for distribution on the home network, may provide that this may be performed without performing message format translation.

Optionally and additionally, the processing performed by the server 6 at s44 may further include determining whether or not the EAS is "applicable" or "relevant". For example, the EAS message may be determined to be "not applicable" if the geographic region to which the EAS message relates is different to the geographic region of the server 6 hosting the CDS 8. Also for example, the EAS message may be determined to be "not applicable" if the EAS message is a "test message". If the EAS message is determined to be "not applicable", the message may be discarded and the process of FIG. 4 may end.

At s46, the server 6 may store the generated XML document representing the EAS event. This may be performed in an implementation-dependent manner.

At s48, the server 6 may create a new EAS message object (i.e., a digital data objects relating to the EAS message). The created EAS message object may include the XML document that may have been created at s44. Alternatively, the created EAS message object may include a URL that may be used to locate the XML document that may have been created at s44.

At s50, the server 6 may add the new EAS message object created at s48 to the EAS content container of the CDS 8. The new EAS message object may be added to objects stored previously in the EAS content container. Alternatively, the new EAS message may update objects stored previously in the EAS content container. Alternatively, the new EAS message may override objects stored previously in the EAS content container.

At s52, the CDS 8 may generate a notification for each of the client devices 10 that have subscribed to the service that notifies them that new EAS messages have been or are being received by the server 6 (e.g., using the process described above with reference to FIG. 3). The notifications generated may be notification that the server 6 has received a new EAS message.

At s54, the CDS 8 may distribute (e.g., as a respective unicast message), to each of the client devices 10 that have subscribed to the service that notifies them that new EAS messages have been or are being received by the server 6, the notification generated for that client device.

Thus, a process by which a new EAS message is received by the server 6, and by which client devices 10 (which has subscribed to a service that notifies them that new EAS messages have been or are being received by the server 6) are notified that a new EAS message has been received by the server 6 is provided.

Figure 5:
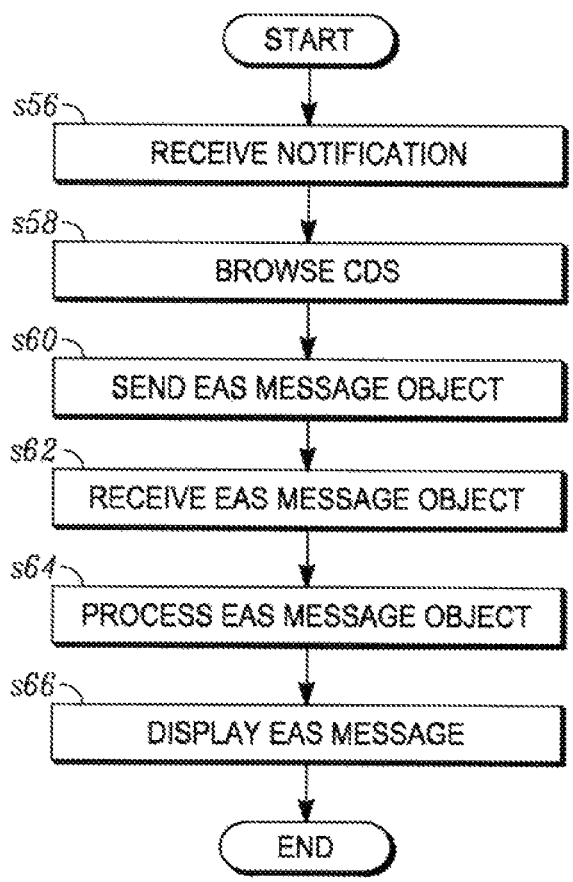
FIG. 5 is a process flow chart showing an example embodiment of a process which a client device may receive and display an Emergency Alert Service message.

FIG. 5 is a process flow chart showing an embodiment of a process by which a client device 10 may receive the EAS message, and display that EAS message to the user 12 of that client device 10. The process of FIG. 5 is described below as being performed by a single client device 10 (referred to in the description of the process as "the client device 10"). However, in operation, the process of FIG. 5 may be performed by one or more (e.g., all) of the client devices 10. In this embodiment, the client device 10 may be a UPnP device.

The process of FIG. 5 may be performed, for example, after having performed the process of FIG. 4.

At s56, the client device 10 may receive a notification that a new or updated EAS message has been received by the server 6 (e.g., distributed to it from the server 6 at s54).

At s58, the client device may browse the CDS 8 (e.g., using any appropriate software application for retrieving, presenting, and traversing information resources on the CDS 8) for any EAS message object created at s48 and stored in the EAS content container of the CDS 8 at s50. This may include the client device 10 sending (e.g., as a unicast message), to the CDS 8, a request that the contents of the EAS content container be delivered to it.

At s60, the CDS 8 may send (e.g., as a unicast message) the EAS message object stored in the EAS content container to the client device 10. Alternatively, the client device 10 may retrieve the EAS message object stored in the EAS content container in the CDS 8. At s62, the client device 10 may receive the EAS message object.

At s64, the client device may process the received EAS message object. This may be performed to acquire (e.g., extract or retrieve) EAS message information for display by the client device 10.

If, for example, the EAS message object includes the XML document created at s44, the EAS message object may be processed to extract this XML document. The XML document may then be processed to provide the EAS message information in a format that may be displayed by the client device 10. Alternatively, if, for example, the EAS message object includes a URL that may be used to locate the XML document created at s44, the EAS message object may be processed to extract this URL. The URL may then be used by the client device to retrieve (e.g., from the server 6 hosting the CDS 8 or another server via the Internet) the XML document created at s44. This XML document may then be processed to provide the EAS message information in a format that may be displayed by the client device 10.

At s66, the client device 10 displays (e.g., on an integrated display) the EAS message for consumption the user 12 of that client device 10.

Thus, a process by which a client device 10 may receive the EAS message, and display that EAS message to the user 12 of that client device 10 is provided.

Figure 6:
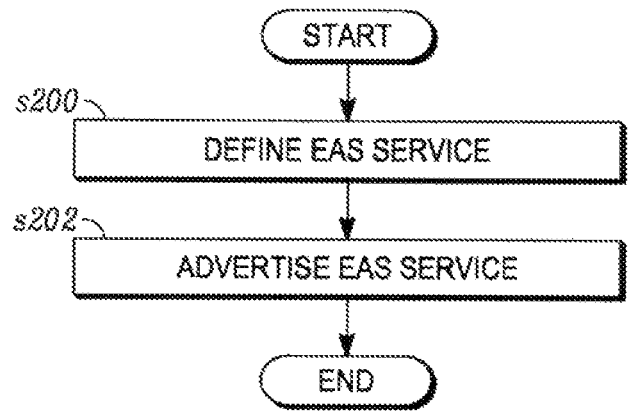
FIG. 6 is a process flow chart showing an example embodiment of a method of preparing a server.

FIG. 6 is a process flow chart showing an embodiment of a method of preparing a media server 6 to provide a client device 10 with a notification that a new EAS message has been received by the server 6.

The process of FIG. 6 may, for example, be performed by the server 6 if a client device 10 cannot receive emergency alerts from digital media servers using UPnP. In this embodiment, the client devices 10 may be configured to implement mDNS (e.g., a client device 10 may support the iOS mobile operating system). Also for example, the process of FIG. 6 may be performed by a media server 6 that supports mDNS instead of UPnP (i.e., a server that supports mDNS and not UPnP).

At s200, the server 6 may construct a Domain Name Service with Service Discovery (DNS-SD) service for an Emergency Alert System (EAS). This may be performed by adding appropriate pointer DNS (PTR) and Service locator (SRV) records to its list of supported services. This may be performed as described in "DNS-Based Service Discovery", Document: draft-cheshire-dnsext-dns-sd-06.txt, Internet-Draft, Category: Standards Track, Stuart Cheshire, Marc Krochmal, 8 Mar. 2010, and www.ietf.org, which is incorporated herein by reference.

At s202, the server 6 may advertise the mDNS EAS message service using any appropriate method, such as any of those described in the above mentioned "DNS-Based Service Discovery".

Thus, a method by which the server 6 may prepare to provide EAS feature support is provided.

Figure 7:
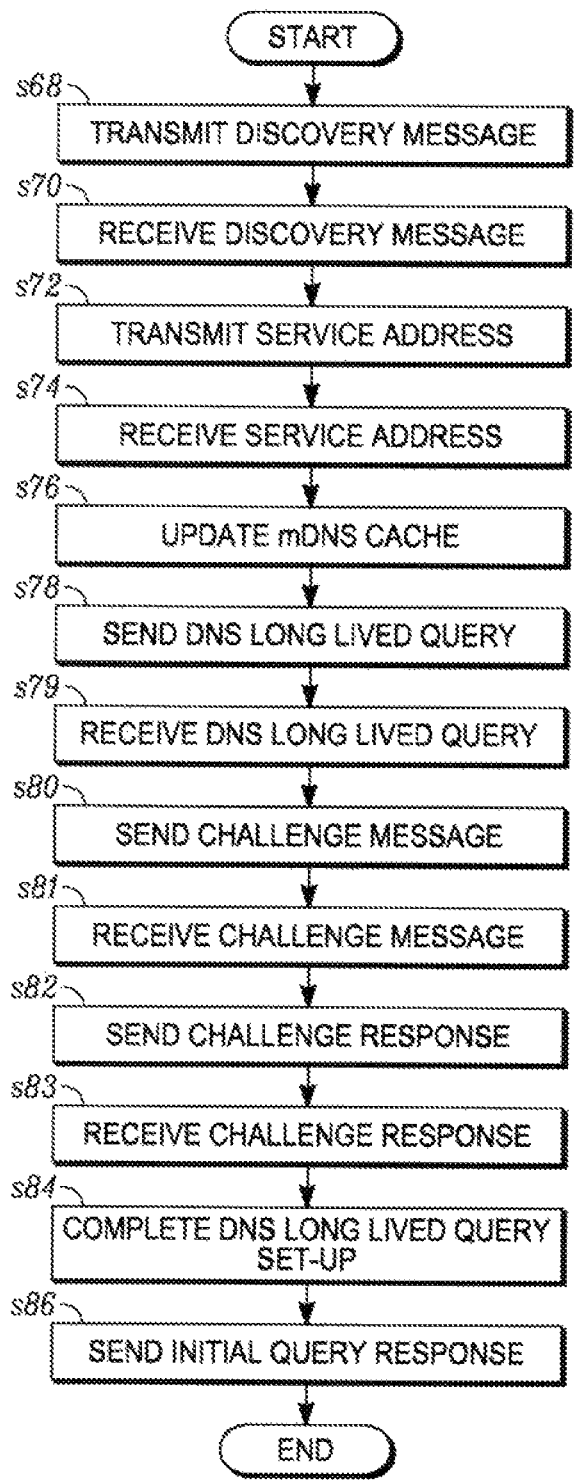
FIG. 7 is a process flow chart showing an example embodiment of a method by which a client device may discover a server and request to be notified if that server receives an Emergency Alert Service message.

FIG. 7 is a process flow chart showing an embodiment of a method by which a client device 10 may discover the server 6 and request to be notified when the server 6 receives an EAS message, or an update to an EAS message. The process of FIG. 7 is described below as being performed by a single client device 10 (referred to in the description of the process as "the client device 10"). However, in operation, the process of FIG. 7 may be performed by one or more (e.g., all) of the client devices 10. In this embodiment, the client device may be device that uses the iOS mobile operating system, or another operating system that uses the Multicast Domain Name Service (mDNS) with Service Discovery (DNS-SD) extension.

The process of FIG. 7 may be performed, for example, after having performed the process of FIG. 6.

At s68, the client device may transmit a discovery message to the server 6. This may be performed by, the client device 10 multicasting a Multicast Domain Name System (mDNS) service discovery message, i.e., the client device 10 delivering an mDNS service lookup request for an EAS message service to the group of destination computers to which it is connected. Multicasting the discovery message tends to be an efficient way to distribute this message. In this embodiment, the client device may search for a device that supports an EAS message delivery service through the use of mDNS.

At s70, the server 6 may receive the mDNS message.

At s72, in response to receiving the mDNS discovery message, the server 6 may send, to the client device 10, a service address. The service address may, for example, be an IP address of the server 6. A server name may also be sent to the client device 10 (e.g., for display purposes). This server name may be provided in accordance with mDNS naming conventions.

At s74, the client device 10 may receive the service address from the server 6.

At s76, the client device 10 may update its mDNS cache using the information from the server 6. The client device may store (e.g., on an integrated storage device) the IP address of the server 6.

Thus, in this embodiment a Domain Name System based Service Discovery (DNS-SD) process may be performed.

At s78, the client device 10 may send (e.g., as a unicast message) a DNS Long Lived Query request to the server 6. This DNS Long Lived Query may be a request that the client device 10 shall be sent (by the server 6) new or updated EAS messages received by the server 6. Further information about DNS Long Lived Queries, DNS Long Lived Query requests, and the DNS Long Lived Query protocol may be found, for example, in "DNS Long-Lived Queries", Document: draft-sekar-dns-llq-01.txt, Internet-Draft, Category: Standards Track, Stuart Cheshire, Marc Krochmal, Kiren Sekar, 10 Aug. 2006, and a www.ietf.org, which is incorporated herein by reference.

The "query type" of the DNS Long Lived Query request may be set to "text" (i.e., TXT). Thus, the client device 10, in effect, requests to receive (from the server 6) EAS messages (or updates to EAS messages) represented by the text records of the server 6. A text record relating to an EAS message may include (e.g., in text form) that EAS message or a URL for a file containing that EAS message.

At s79, the server 6 may receive the DNS Long Lived Query request. The handling of DNS Long-Lived Query requests by the server 6 may comply with the protocol and message exchanges described in the above mentioned "DNS Long-Lived Queries".

At s80, in response to receiving the DNS Long Lived Query request, the server 6 may send, to the client device 10, a "query identifier challenge". This challenge message may include information about any error(s) in the DNS Long Lived Query request sent to the server 6 from the client device 10. The challenge message may further include unique identifiers for successful DNS Long Lived Query requests. Further information about the challenge message may be found in "DNS Long-Lived Queries", Document: draft-sekar-dns-llq-01.txt, Internet-Draft, Category: Standards Track, Stuart Cheshire, Marc Krochmal, Kiren Sekar, 10 Aug. 2006, and a www.ietf.org, which is incorporated herein by reference.

At s81, the client device 10 may receive the query identifier challenge.

At s82, in response to receiving the query identifier challenge from the server 6, the client device 10 may return the query identifier challenge to the server 6. Thus, the client device 10 may "echo" the unique identifier(s) for the successful DNS Long Lived Query requests back to the server 6. Thus, the client device 10 demonstrates its reachability and willingness to participate to the server 6. Further information about the challenge response may be found in "DNS Long-Lived Queries", Document: draft-sekar-dns-llq-01.txt, Internet-Draft, Category: Standards Track, Stuart Cheshire, Marc Krochmal, Kiren Sekar, 10 Aug. 2006, and a www.ietf.org, which is incorporated herein by reference.

At s83, the server 6 may receive the query identifier challenge.

At s84, in response to receiving back the query identifier challenge, the server 6 may complete the set-up for the DNS Long Lived Query for the client device 10.

At s86, the server 6 may send (e.g., as a unicast message) an initial query response to the client device 10. The initial query response may include any appropriate information. For example, if the server 6 has received, from the service provider 4, an EAS message prior to the client device 10 discovering the server 6 (e.g., prior to the client device 10 joining the home network), the initial query response may include TXT records for the EAS message already received.

Thus, a method by which a client device 10 may discover the server 6 and request to be notified when the server 6 receives an EAS message, or an update to an EAS message is provided.

Figure 8:
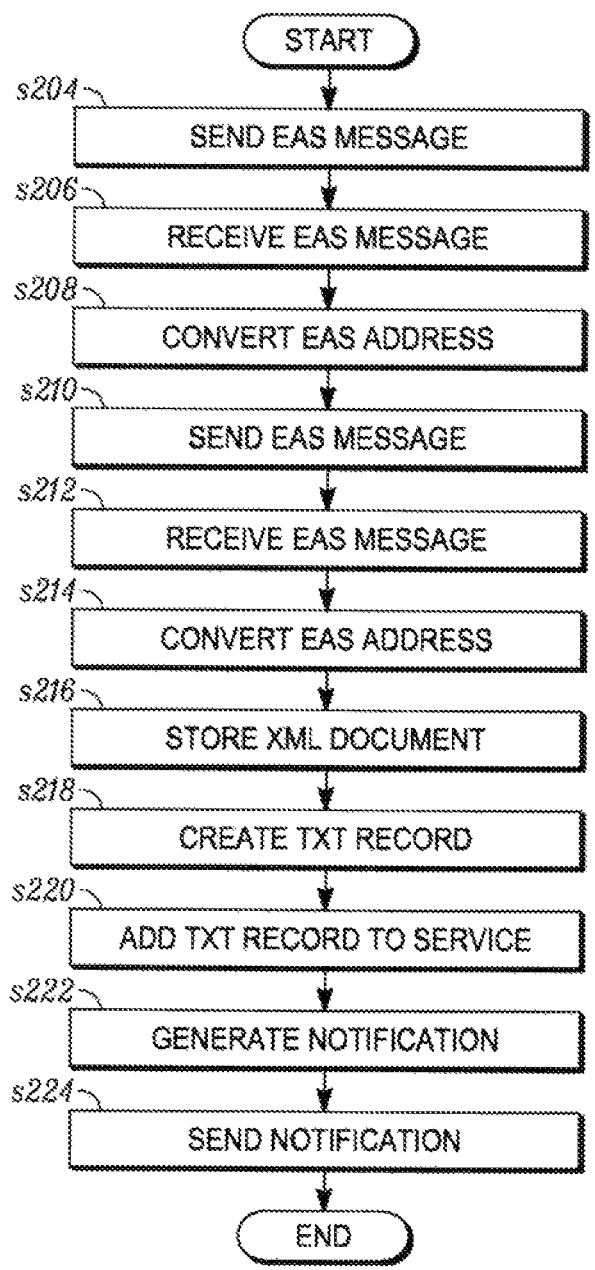
FIG. 8 is a process flow chart showing an example embodiment of a process by which an Emergency Alert Service message may be received by a server, and by which client devices may be notified.

FIG. 8 is a process flow chart showing an embodiment of a process by which a new EAS message may be received by the server 6, and by which client devices 10 may be notified that a new EAS message has been received by the server 6.

The process of FIG. 8 may be performed, for example, after having performed the process of FIG. 6 and/or FIG. 7.

At s204, the EAS source 2 may send an EAS message to the service provider 4. The EAS message may be sent from the EAS source 2 to the service provider 4 in any appropriate format and via any appropriate transmission medium.

At s206, the service provider 4 may receive the EAS message from the EAS source 2.

At s208, the service provider 4 may process the received EAS message. This may be performed to convert the received EAS message into SCTE-18 format, or generate an SCTE-18 message corresponding to the received EAS message e.g., as described in more detail earlier above with reference to s38 of the process of FIG. 4.

At s210, the EAS message (e.g., in SCTE-18 format) may be delivered from the service provider 4 to the server 6. The EAS message may be delivered from the service provider 4 to the server 6 using any appropriate transmission medium and any appropriate transmission method.

At s212, the server 6 may receive the EAS message (e.g., in SCTE-18 format).

At s214, the server 6 may process the received EAS message. This may be performed to convert the received EAS message e.g., to convert the EAS message from SCTE-18 format into SCTE-162 format e.g., as described in more detail earlier above with reference to s44 of the process of FIG. 4.

At s216, the server 6 may store the generated XML document representing the EAS event. This may be performed in an implementation-dependent manner.

At s218, the server may represent the EAS message using a DNS-SD text record. This may be performed using any appropriate method, such as any of those described in the above mentioned "DNS-Based Service Discovery".

At s220, the server 6 may add the DNS-SD text record to the EAS message service (that may have been defined as described above with reference to FIG. 6).

At s222, the server 6 may generate a notification for each of the client devices 10 that have (e.g., using the process of FIG. 7) requested to be notified when the server 6 receives an EAS message, or an update to an EAS message.

At s224, the server 6 may distribute (e.g., as a respective unicast message), to each of the client devices 10 that have requested to be notified when the server 6 receives an EAS message, or an update to an EAS message, the notification generated for that client device.

Thus, a process by which a new EAS message is received by the server 6, and by which client devices 10 may be notified is provided.

Figure 9A:
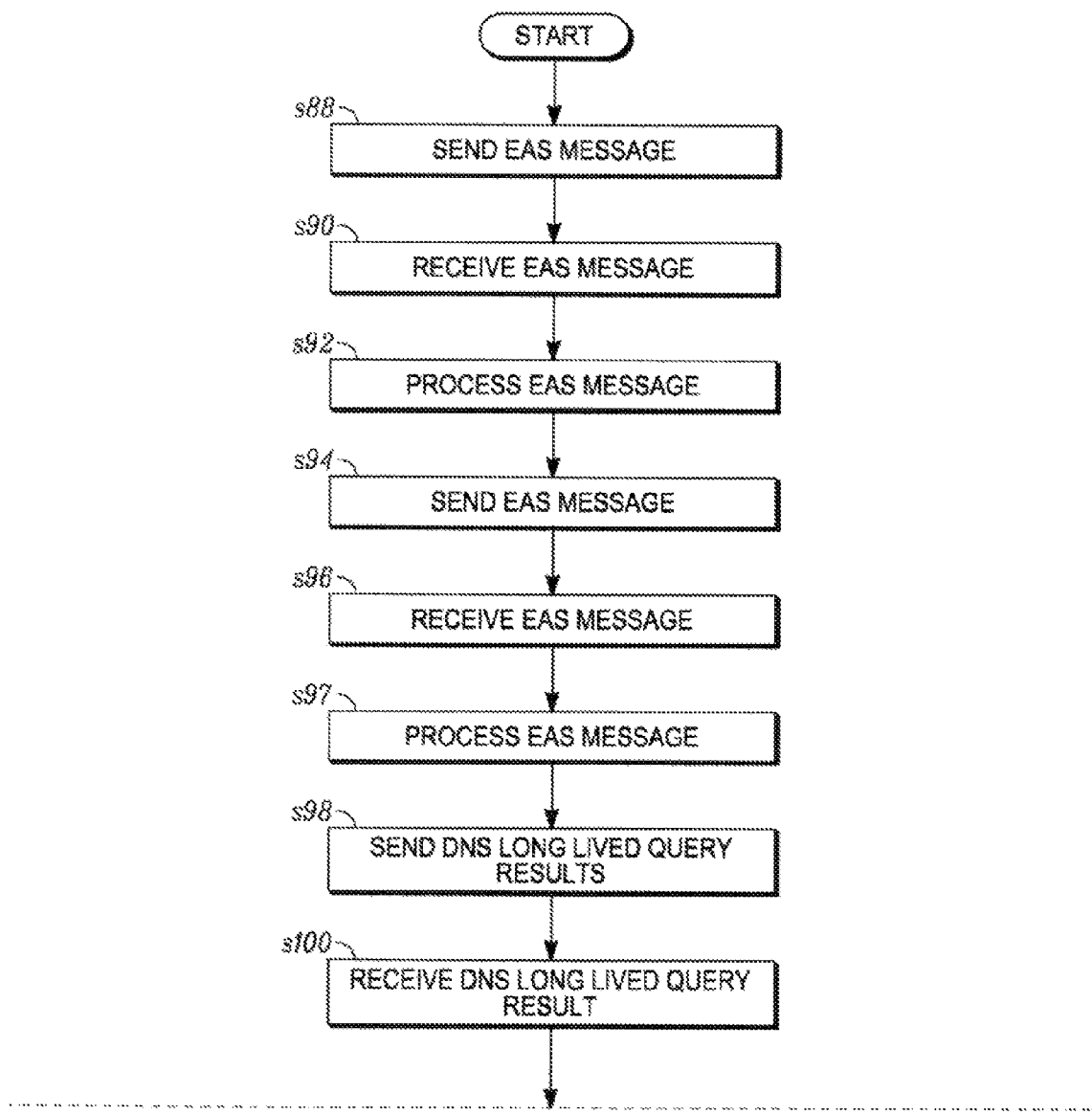
FIGS. 9A and 9B are process flow charts showing an example embodiment of a process by which an Emergency Alert Service message may be received by a server and displayed by a client device.
Figure 9B:
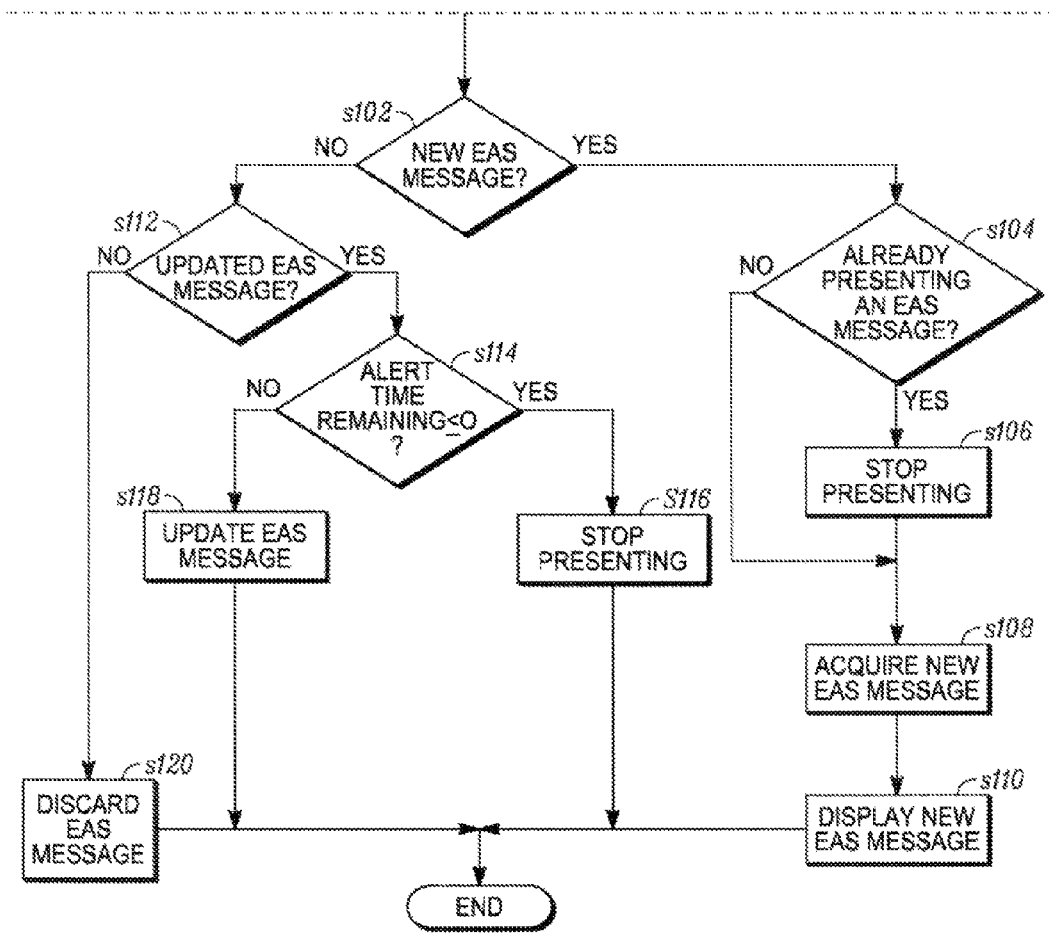

FIGS. 9A and 9B are process flow charts showing an embodiment of a process by which a new or updated EAS message may be received by the server 6, acquired by a client device 10, and displayed to the user 12 of that client device 10. The process of FIGS. 9A and 9B is described below as being performed by a single client device 10 (referred to in the description of the process as "the client device 10"). However, in operation, the process of FIGS. 9A and 9B may be performed by one or more (e.g., all) of the client devices 10. In this embodiment, the client device may be configured to implement mDNS. For example, the client device may be a device that uses the iOS mobile operating system.

The process of FIGS. 9A and 9B may be performed, for example, after having performed the process of FIG. 7.

At s88 the EAS source 2 may send an EAS message to the service provider 4. The EAS message may be sent from the EAS source 2 to the service provider 4 in any appropriate format and via any appropriate transmission medium.

At s90, the service provider 4 may receive the EAS message from the EAS source 2.

At s92, the service provider 4 may process the received EAS message prior to it being transmitted to the server 6. This may be performed, for example, in the same way as that described above at s38 of FIG. 4.

At s94, the EAS message may be delivered from the service provider 4 to the server 6. The EAS message may be delivered from the service provider 4 to the server 6 using any appropriate transmission medium and any appropriate transmission method. The EAS message may be delivered in any appropriate format.

At s96, the server 6 may receive the EAS message.

At s97, the server 6 may process the received EAS message. This may, for example, be performed as follows.

Firstly, the server 6 may translate the received EAS message from the received format (e.g., SCTE-18) to home network format (e.g., SCTE-162). This may, for example, be performed as described above with reference to s44 of the process of FIG. 4.

If the EAS message is a new message, the server 6 may then add the translated message to an XML document containing active alert messages. Thus, a new EAS message file may be created. The server 6 may then add field(s) in the TXT resource record containing the URL pointing to active alert message XML document.

Alternatively, if the EAS message is not a new message, but is an updated existing message, the server 6 may then update the XML document containing active alert messages. Thus, an EAS message file may be updated. The server 6 may then update field(s) in the TXT resource record containing the URL pointing to active alert message XML document.

Alternatively, if the EAS message is a duplicate message, the message may be discarded by the server 6, and the process of FIGS. 9A and 9B may end.

At s98, the server 6 may distribute (e.g., as one or more unicast messages) DNS Long Lived Query results to each client device 10 that has posted a DNS Long Lived Queries with the server 6. Thus, the server 6 may send, to a client device 10 that posted a DNS Long Lived Query, text resource records relating to the received new or updated EAS message.

At s100, the client device 10 may receive the DNS Long Lived Query result.

At s102, the client device 10 may examine or process the received DNS Long Lived Query result. For example, the client device 10 may examine the received text resource record. This may be performed to determine if the DNS Long Lived Query result indicates that a new EAS message has been received by the server 6.

The client device 10 may determine whether an EAS message is a new message in accordance with requirements of the EAS protocol being used on the network 1 (e.g., in accordance with SCTE-18). In other embodiments, a different appropriate way of differentiating between new and old (e.g., duplicate) messages may be used.

If at s102, it is determined that the DNS Long Lived Query result indicates that the EAS message that has been received by the server 6 is a new EAS message, the method proceeds to s104. However, if at s102, it is determined that the DNS Long Lived Query result indicates that the EAS message that has been received by the server 6 is not a new EAS message, the method proceeds to s112. s112 will be described in more detail later below after the description of s104 to s110.

At s104, the client device 10 may determine whether or not it is already displaying (e.g., on an integrated display) an (e.g., older) EAS message.

If at s104, it is determined that the client device 10 is already displaying an EAS message, the method proceeds to s106. However, if at s104, it is determined that the client device 10 is not already displaying an EAS message, the method proceeds to s108.

At s106, the presentation (i.e., display) of the older EAS message currently being displayed by the client device 10 may be stopped. That older EAS message may then be discarded.

At s108, the client device 10 may process the received DNS Long Lived Query result. The client device may do this to acquire (e.g., extract or retrieve) the new EAS message information for display by the client device 10.

If, for example, the text resource record includes the new EAS message (in text form), the text resource record may be processed to extract the new EAS message. Alternatively, if, for example, the text resource record includes a URL that may be used to locate the new EAS message, the text resource record may be processed to extract this URL. The URL may then be used by the client device to retrieve (e.g., from a further server via the Internet) the new EAS message.

At s110, the client device 10 may display (e.g., on an integrated display) the new EAS message for consumption the user 12 of that client device 10.

After performing s110, the method of FIGS. 9A and 9B may end.

Returning now to the case where, at s102, it is determined that the DNS Long Lived Query result indicates that the EAS message that has been received by the server 6 is not a new EAS message, at s112, the client device 10 may further examine the received DNS Long Lived Query result. For example, the client device 10 may further examine the received text resource record. This may be performed to determine if the DNS Long Lived Query result indicates that an updated EAS message has been received by the server 6.

If at s112, it is determined that the DNS Long Lived Query result indicates that the EAS message that has been received by the server 6 is an updated EAS message, the method proceeds to s114. However, if at s112, it is determined that the DNS Long Lived Query result indicates that the EAS message that has been received by the server 6 is not an updated EAS message, the method proceeds to s120. s120 will be described in more detail later below after the description of s114 to s118.

At s114, it may be determined by the client device 10 whether or not the remaining alert time is equal to or less than zero (i.e., whether or not the remaining time for which the EAS message should be shown is equal to or less than zero). Any appropriate method of specifying an amount of alert time may be used. For example, a text resource record for an EAS message may specify a date/time beyond which the EAS message should not be displayed. In the case that the text resource record for an EAS message contains a URL that may be used to retrieve an EAS message, including alert time information in the text resource record for an EAS message may allow the client device 10 to determine whether or not it needs to retrieve the actual EAS message. Thus, a client device 10 may avoid fetching a message file that is not needed. In the case of an EAS message that requires no action from the client device 10 (except perhaps to update the alert time remaining), the client device 10 may get the information it needs from the text resource record (i.e., the event notification).

If at s114, it is determined that the remaining alert time is equal to or less than zero, the method proceeds to s116. However, if at s112, it is determined that the remaining alert time is not equal to or less than zero (i.e., is greater than zero), the method proceeds to s118.

At s116, the presentation (i.e., display) of the EAS message currently being displayed by the client device 10 may be stopped. That EAS message may then be discarded.

After performing s116, the method of FIGS. 9A and 9B may end.

At s118, the EAS message currently being displayed by the client device 10 may be updated. This may be performed using an updated message specified in the text resource record for the EAS message, or retrieved using a URL specified in the text resource record for the EAS message.

After performing s118, the method of FIGS. 9A and 9B may end.

Returning now to the case where, at s112, it is determined that the DNS Long Lived Query result indicates that the EAS message that has been received by the server 6 is not an updated EAS message, at s120 the received DNS Long Lived Query (e.g., the received text resource record) may be discarded. This may be performed because it may be determined that the EAS message received by the server 6 is a duplicate message.

After performing s120, the method of FIGS. 9A and 9B may end.

Thus, a process by which a new or updated EAS message may be received by the server 6, acquired by a client device 10, and displayed to the user 12 of that client device 10 is provided.

The systems and methods disclosed herein may enable the delivery of SCTE-18 EAS messages from a UPnP server device to UPnP client devices e.g., in a home network. Furthermore, the systems and methods disclosed herein may provide a manner for delivering delivery EAS messages to client devices that support mDNS Furthermore, the systems and methods disclosed herein for processing EAS messages may reduce or minimize the duplication of messages for EAS support.

The server (which may offer services such as the live broadcast of multimedia content from one or more sources) may advertise support for EAS message distribution. Furthermore, the server may provide such advertisements to clients in the home network. Furthermore, the server may distribute EAS messages to client devices in the home network. This may be performed with minimal delay. Furthermore, the server may provide references to channel and audio alert resources, and map these resources to local URLs which the server may resolve for the client devices.

Advertising of support for EAS message distribution by the server may be performed through service description. Advertising of support for EAS message distribution by the server may be performed through container presence. Advertising of support for EAS message distribution by the server may be in CDS feature list. Thus, advertising may use existing, standard CDS capability. Furthermore, client devices may be directly informed of the presence of the feature. Furthermore, client devices may be directly provided with an identifier for the emergency alert message container. Furthermore, client devices may be provided with other feature support, such as a dedicated event subscription URL. Advertising of support for EAS message distribution by the server may be provided as an mDNS service. Thus, the techniques disclosed herein may provide support for devices that are not compliant with Digital Living Network Alliance (DLNA) requirements, and may provide support for iOS devices that are otherwise not supported by current techniques.

Using above described methods, UPnP client devices may locate a server on the home network that supports the EAS message feature. A UPnP CDS may provide EAS support.

Above described system and methods may provide for the conversion of EAS messaging from one format (e.g., SCTE-18), by the device hosting the CDS (i.e., the server), to a format suitable for distribution on the home network client devices (e.g., SCTE-162).

Above described system and methods may provide for (e.g., if EAS messages are delivered by IP multicast from a head-end server) the repackaging of the EAS messages for distribution to client devices on the home network.

The client devices may be capable of independently evaluating all message criteria to determine whether a message is active; how to present the alert message (text scroll, text scroll with audio, video details or deferred by exception channel list, and so on); and when a message has expired.

The server and CDS disclosed herein may be capable of dealing with EAS message expiration. For example, the CDS may monitor the duration of each active alert message. At message expiration, the CDS may delete the message, e.g., regardless of how it is represented. The CDS may not generate event notifications upon message expiration. Client devices may also check for message expiration.

The invention claimed is:

1. A method for configuring a home network for emergency messaging, the method comprising:
receiving, by a home communications server and from a client device, a discovery message that is in search of a device that supports an emergency message service;
transmitting, by the home communications server and to the client device in response to receiving the discovery message, a response specifying that the home communications server supports an emergency message service, the response including a service address of the home communications server;
receiving, by the home communications server and from the client device, a request that the client device be notified that the home communications server has received an emergency alert message, wherein the request includes the service address of the home communications server;
in response to receiving the request, registering, by the home communications server, the client device as a device that will be transmitted notifications regarding emergency alert messages received by the home communications server;
receiving, by the home communications server and from an entity remote from the home communications server, an emergency alert message that is broadcast in a first format; and
transmitting, by the home communications server and to the client device, a notification indicating that the home communications server has received the emergency alert message, based on the client device being registered to be transmitted the notifications, wherein the home communications server and the client device are each part of the home network.

2. The method of claim 1, further comprising converting, by the home communications server, the emergency alert message from the first format to a second format that is suitable for distribution to the client device over the home network.

3. The method of claim 2, further comprising:
transmitting, by the home communications server and to the client device, a query identifier challenge specifying one or more unique identifiers corresponding to successful requests;
receiving, by the home communications server and from the client device, a challenge response that includes the one or more unique identifiers, wherein:
registering the client device as a device that will be transmitted notifications regarding emergency alert messages received by the home communications server comprises registering the client in response to receiving the request and receiving the challenge response that includes the one or more unique identifiers that were transmitted by the home communications server,
the second format is different from the first format, and
the second format is an Extensible Markup Language format.

4. The method of claim 3, wherein the first format is compliant with an SCTE-18 standard and the second format is compliant with an SCTE-162 standard.

5. The method of claim 1, wherein the emergency alert message is a national warning system message.

6. The method of claim 1, wherein the notification comprises information that the client device is configured to analyze to ascertain whether the emergency alert message is a new emergency alert message, an updated emergency alert message, or a duplicate emergency alert message.

7. The method of claim 1, further comprising providing, by the home communications server and to the client device, the emergency alert message or a Universal Resource Locator from which the emergency alert message is retrievable.

8. The method of claim 1, wherein:
the request is a Domain Name System Long Lived Query request; and
the emergency alert message or information related to the emergency alert message is transmitted, by the home communications server and to the client device, as a Domain Name System Long Lived Query result.

9. The method of claim 1, wherein the client device communicates with the home communications server using a Multicast Domain Name Service protocol.

10. A home communications server, comprising:
one or more communications components arranged to communicate with multiple client devices that are part of a same residential Local Area Network as the home communications server, wherein the communications components include at least one of a wireline communications interface or a wireless communications interface;
a data store storing data identifying a set of client devices that will be transmitted notifications regarding emergency alert messages received by the home communications server; and
one or more hardware processors arranged to interact with the data store and the one or more communications components, the one or more hardware processors further arranged to configure the residential Local Area Network for emergency messaging by:
transmitting, to a client device and in response to receiving a discovery message from the client device, a message specifying that the home communications server supports an emergency message service, the message including a service address of the home communications server;
receiving, by the home communications server and from the client device, a request that the client device be notified that the home communications server has received an emergency alert message, wherein the request includes the service address of the home communications server;
in response to receiving, from the client device, a request that (i) includes the service address of the home communications server and (ii) requests that the client device be notified when the home communications server has received an emergency alert message, registering the client device as a device that will be transmitted notifications regarding emergency alert messages received by the home communications server; and
in response to receiving, from an entity remote from the home communications server, an emergency alert message, transmitting, to the client device, a notification indicating that the home communications server has received the emergency alert message, wherein the transmitting occurs based on the client device being registered to be transmitted the notifications, and wherein the home communications server and the client device are each part of the residential Local Area Network.

11. The home communications server of claim 10, further arranged to convert the emergency alert message from a first format to a second format that is suitable for distribution to the client device over the residential Local Area Network.

12. The home communications server of claim 11, further arranged to configure the residential Local Area Network for emergency messaging by:
transmitting, to the client device, a query identifier challenge specifying one or more unique identifiers corresponding to successful requests;
receiving, from the client device, a challenge response that includes the one or more unique identifiers, wherein:
registering the client device as a device that will be transmitted notifications regarding emergency alert messages received by the home communications server comprises registering the client in response to receiving the request and receiving the challenge response that includes the one or more unique identifiers that were transmitted by the home communications server, the second format is different from the first format, and the second format is an Extensible Markup Language format.

13. The home communications server of claim 12, wherein the first format is compliant with an SCTE-18 standard and the second format is compliant with an SCTE-162 standard.

14. The home communications server of claim 10, wherein the emergency alert message is a national warning system message.

15. The home communications server of claim 10, wherein the notification comprises information that the client device is configured to analyze to ascertain whether the emergency alert message is a new emergency alert message, an updated emergency alert message, or a duplicate emergency alert message.

16. The home communications server of claim 10, further arranged to configure the residential Local Area Network for emergency messaging by providing, to the client device, the emergency alert message or a Universal Resource Locator from which the emergency alert message is retrievable.

17. The home communications server of claim 10, wherein:

the request is a Domain Name System Long Lived Query request; and the emergency alert message or information related to the emergency alert message is transmitted, by the home communications server and to the client device, as a Domain Name System Long Lived Query result.

18. The home communications server of claim 10, wherein the client device communicates with the home communications server using a Multicast Domain Name Service protocol.

19. A system, comprising:

one or more communications components arranged to communicate with multiple client devices that are part of a same residential Local Area Network as the home communications server, wherein the communications components include at least one of a wireline communications interface or a wireless communications interface;

one or more hardware processors arranged to interact with the one or more communications components; and a non-transitory machine readable medium storing instructions that, upon execution of the instructions by the one or more hardware processors causes the one or more hardware processors to perform operations including:

transmitting, to a client device and in response to receiving a discovery message from the client device, a message specifying that the home communications server supports an emergency message service, the message including a service address of the home communications server;

receiving, by the home communications server and from the client device, a request that the client device be notified that the home communications server has received an emergency alert message, wherein the request includes the service address of the home communications server;

in response to receiving, from the client device, a request that (i) includes the service address of the home communications server and (ii) requests that the client device be notified when the home communications server has received an emergency alert message, registering the client device as a device that will be transmitted notifications regarding emergency alert messages received by the home communications server; and in response to receiving, from an entity remote from the home communications server, an emergency alert message, transmitting, to the client device, a notification indicating that the home communications server has received the emergency alert message, wherein the transmitting occurs based on the client device being registered to be transmitted the notifications, and wherein the home communications server and the client device are each part of the residential Local Area Network.

20. The system of claim 19, wherein the instructions cause the one or more hardware processors to perform operations including converting the emergency alert message from a first format to a second format that is suitable for distribution to the client device over a residential Local Area Network.

21. The system of claim 20, wherein the instructions cause the one or more hardware processors to perform operations including:

transmitting, to the client device, a query identifier challenge specifying one or more unique identifiers corresponding to successful requests;

receiving, from the client device, a challenge response that includes the one or more unique identifiers, wherein:

registering the client device as a device that will be transmitted notifications regarding emergency alert messages received by the home communications server comprises registering the client in response to receiving the request and receiving the challenge response that includes the one or more unique identifiers that were transmitted by the home communications server, the second format is different from the first format, and the second format is an Extensible Markup Language format.

22. The system of claim 21, wherein the first format is compliant with an SCTE-18 standard and the second format is compliant with an SCTE-162 standard.

23. The system of claim 19, wherein the emergency alert message is a national warning system message.

24. The system of claim 19, wherein the notification comprises information that the client device is configured to analyze to ascertain whether the emergency alert message is a new emergency alert message, an updated emergency alert message, or a duplicate emergency alert message.

25. The system of claim 19, wherein the instructions cause the one or more hardware processors to perform operations including providing, to the client device, the emergency alert message or a Universal Resource Locator from which the emergency alert message is retrievable.

26. The system of claim 19, wherein:

the request is a Domain Name System Long Lived Query request; and the emergency alert message or information related to the emergency alert message is transmitted, by the home communications server and to the client device, as a Domain Name System Long Lived Query result.

27. The system of claim 19, wherein the client device communicates with the system using a Multicast Domain Name Service protocol.

* * * * *